(12) United States Patent
Hibi et al.

(10) Patent No.: US 7,600,365 B2
(45) Date of Patent: Oct. 13, 2009

(54) WALK-TYPE LAWN MOWER AND CATCHER FRAME APPARATUS

(75) Inventors: Yoshihisa Hibi, Toyokawa (JP); Graeme Sidney Parris, Toyokawa (JP); Akio Hayashi, Toyokawa (JP)

(73) Assignee: Kyoeisha Co., Ltd., Aichi-Pref. (JP)

( * ) Notice: Subject to any disclaimer, the term of this patent is extended or adjusted under 35 U.S.C. 154(b) by 0 days.

(21) Appl. No.: 12/219,368

(22) Filed: Jul. 21, 2008

(65) Prior Publication Data
US 2009/0025355 A1    Jan. 29, 2009

(30) Foreign Application Priority Data
Jul. 26, 2007  (JP)  ............... 2007-194322

(51) Int. Cl.
A01D 43/06 (2006.01)
A01D 43/00 (2006.01)
(52) U.S. Cl. .......................... 56/199; 56/202
(58) Field of Classification Search ............... 56/7, 56/194, 198–200, 202
See application file for complete search history.

(56) References Cited
U.S. PATENT DOCUMENTS

| | | | |
|---|---|---|---|
| 3,099,122 A * | 7/1963 | Sakatani | ............ 56/199 |
| 3,408,801 A | 11/1968 | Kroll | |
| 3,521,436 A | 7/1970 | Venzke | |
| 5,228,277 A * | 7/1993 | Smith et al. | ............ 56/16.9 |
| 5,261,213 A * | 11/1993 | Humphrey | ............ 56/2 |
| 5,412,931 A | 5/1995 | Reichen et al. | |
| 5,533,326 A | 7/1996 | Goman et al. | |
| 6,237,313 B1 | 5/2001 | Leden | |
| 6,341,478 B1 | 1/2002 | Sallstrom et al. | |
| 7,331,166 B2 * | 2/2008 | Phillips | ............ 56/7 |
| 2002/0017086 A1* | 2/2002 | Sallstrom et al. | ............ 56/7 |
| 2007/0256401 A1* | 11/2007 | Hibi et al. | ............ 56/10.5 |

FOREIGN PATENT DOCUMENTS

| | | |
|---|---|---|
| JP | 5-39564 | 6/1993 |
| JP | 3884055 | 11/2006 |

* cited by examiner

*Primary Examiner*—Robert E Pezzuto
*Assistant Examiner*—Joan D Misa
(74) *Attorney, Agent, or Firm*—Wenderoth, Lind & Ponack, L.L.P.

(57) ABSTRACT

A catcher frame apparatus is provided including a catcher frame and a catcher roller mounted to the front lower end of a catcher supporting unit of the catcher frame along the direction of the width of a machine body. The catcher frame is connected to the machine body so as to be capable of rotating about an axis of rotation extending along the direction of the width of the machine body, and the catcher supporting unit of the catcher frame is arranged in front of a lawn mowing unit, so that substantially the entire weight of lawn chips stored in a grass catcher supported by the catcher supporting unit is applied to the catcher roller.

13 Claims, 11 Drawing Sheets

WALK-TYPE LAWN MOWER AND CATCHER FRAME APPARATUS

BACKGROUND OF THE INVENTION

1. Field of the Invention

The present invention relates to a walk-type lawn mower including a lawn mowing unit mounted integrally thereto in front of a machine body and a grass catcher for storing lawn chips arranged in front of the lawn mowing unit and being configured to be operated as an operator walks behind the machine body, and a catcher frame apparatus.

2. Description of the Related Art

The walk-type lawn mower in the above form is generally classified into two types depending on the mounting structure of the lawn mowing unit to the machine body. One is a type having a lawn mowing unit U' provided integrally in front of a machine body 1' and a grass catcher G' detachably attached to a frame of the lawn mowing unit U' as shown in FIG. 10, which is referred to as "machine-body integrated type", hereinafter (see FIG. 4 in Japanese Patent No. 3884055). The other one is a type having a lawn mowing unit U" mounted in front of a machine body 1" via a unit frame 91 in a state of being towed and a grass catcher G" detachably mounted to the unit frame 91 as shown in FIG. 11, which is referred to as "tow type" hereinafter (see JP-B-5-39564).

The lawn mower of the "machine-body integrated type" has such advantages that it is composed of a small number of components and hence is simple in structure, and is maintenance-friendly. However, it has such a drawback that the weight of lawn chips L stored in the grass catcher G' increases in proportion to the amount of mowing operation and the weight is applied to a front roller 4' of the lawn mowing unit U' directly and causes the front roller 4' to weigh down. On the other hand, the mowing height of the lawn achieved by the lawn mowing unit U' is determined by the height of the front roller 4' of the lawn mowing unit U'. Therefore, there arises a problem such that when the weight of the lawn chips L stored in the grass catcher G' increases in association of the progress of the mowing operation, the amount of weighing down of the front roller 4' of the lawn mowing unit U' gradually increases, and hence the mowing height of the lawn is gradually lowered.

In the case of the lawn mower of the "tow type", the machine body 1" and the lawn mowing unit U" are separated, and the weight of the lawn chips L stored in the grass catcher G" is applied to a unit roller 92 mounted to the lower front of the unit frame 91 and is not applied to a front roller 4", and hence the mowing height is little changed from the beginning to the end of the mowing operation. Furthermore, since the lawn mowing unit U" is able to follow the direction of travel of the machine body 1", the direction orthogonal thereto, and the inclination (undulation) of the lawn along the composite direction of these two directions, the mowing operation is easily carried out even on the inclined surface. However, since the number of components is significantly large, and the entire length of the lawn mower is long, a large force is required when the operator pushes down a handle to lift the lawn mowing unit U" to change the direction of mowing during the mowing operation or to transfer the lawn mower and, simultaneously, since the lawn mowing unit U" is brought into a state of being suspended by a chain 93 from the unit frame 91, the operator needs to push the handle down by a large amount correspondingly, which deteriorates the operability. In FIG. 10 and FIG. 11, reference numerals 2' and 2" designate reel cutters of the lawn mowing units U' and U", and reference numerals 9' and 9" designate driving drums.

SUMMARY OF THE INVENTION

Accordingly, it is an object of the present invention to provide a lawn mower of a "machine-body integrated type" having a configuration in which the weight of lawn chips does not affect a front roller of a lawn mowing unit even when the weight is increased with the lawn chips stored in a grass catcher, and being able to mow the lawn at a preset mowing height from the beginning to the end of the mowing operation.

In order to achieve the object described above, the invention according to a first aspect is a walk-type lawn mower having a lawn mowing unit mounted integrally thereto in front of a machine body and a grass catcher arranged in front of the lawn mowing unit for storing lawn chips mowed by the lawn mowing unit and being of a type to be operated by an operator walking behind the machine body including: a catcher frame apparatus including a catcher frame having a catcher supporting unit for detachably supporting the grass catcher and a connecting rod for connecting the catcher supporting unit to the machine body so as to be capable of rotating about an axis of rotation along the direction of the width of the machine body and a catcher roller mounted to the front lower end of the catcher supporting unit of the catcher frame along the direction of the width of the machine body, in which the catcher supporting unit of the catcher frame is arranged in front of the lawn mowing unit so that the substantially entire weight of the lawn chips stored in the grass catcher supported by the catcher supporting unit is applied to the catcher roller.

When the mowing operation proceeds, the lawn chips of an amount in proportion to the amount of mowing operation are stored in the grass catcher and hence the weight of the lawn chips gradually increases. In the invention according to the first aspect, the catcher supporting unit of the catcher frame which constitutes the catcher frame apparatus is arranged in front of the lawn mowing unit, and the catcher supporting unit is connected by the connecting rod so as to rotate about the axis of rotation extending in the direction of the width of the machine body. Therefore, the substantially entire weight of the grass catcher and the lawn chips stored in the catcher is applied to the catcher roller mounted to the front lower end of the catcher supporting unit, and is rarely applied to the machine body by itself. Consequently, even though the weight of the lawn chips stored in the grass catcher increases, the weight applied to a front roller which determines the mowing height of the lawn achieved by the lawn mowing unit does not increase at all or increases little, so that the mowing height of the lawn is constantly maintained from the beginning to the end of the mowing operation.

The catcher supporting unit is connected to the machine body via the connecting rod so as to be capable of rotating about the axis of rotation which extends in the direction of the width of the machine body. Therefore, when the lawn surface is inclined along the direction of travel of the machine body, the catcher supporting unit rotates with respect to the machine body by an angle corresponding to the inclination and hence the catcher roller is constantly in touch with the lawn surface during the travel. In other words, regarding the inclination of the lawn surface along the direction of travel of the machine body, the catcher roller mounted to the front lower end of the catcher supporting unit and the front roller of the lawn mowing unit follow the inclined surface independently and hence the front roller of the lawn mowing unit which determines the mowing height is prevented from lifting, so that the lawn is mowed constantly at a preset mowing height. Since the catcher roller mounted to the front lower end of the catcher supporting unit travels at the forefront of the machine body, it functions as a dewlap roller when mowing a lawn moist with dew, and hence the mowing operation for the lawn moist with dew is smoothly carried out.

The invention according to a second aspect is characterized in that the catcher supporting unit of the catcher frame is mounted to the machine body via the connecting rod so as to be capable of rotating about the axis of rotation extending along the substantially fore-and-aft direction of the machine body for achieving followability to the inclined surface in the direction of the width of the machine body during the mowing operation.

According to the second aspect of the invention, the catcher roller mounted to the front lower end of the catcher supporting unit is able to follow not only the inclination along the direction of travel of the machine body but also the inclination along the direction of the width of the machine body. Therefore, the weight of the lawn chips stored in the grass catcher is applied to the catcher roller mounted to the front lower end of the catcher supporting unit constantly in a stabilized state irrespective of the presence or absent of the inclination of the lawn surface in any directions. Therefore, the weight of the lawn chips stored in the grass catcher does not act on the machine body irrespective of the direction of inclination of the lawn surface, whereby the mowing operation is carried out at a constantly stable mowing height of the lawn.

The invention according to a third aspect is characterized in that the machine body includes a controlling member for controlling the catcher supporting unit of the catcher frame as so not to be lowered with respect to the machine body to a level exceeding a preset and preventing the catcher supporting unit from inclining in the direction of the width of the machine body by an angle exceeding a present angle.

According to the third aspect of the invention, the catcher supporting unit and the catcher roller mounted to the front lower end of the catcher supporting unit are prevented from lowering excessively with respect to the machine body or from inclining excessively in the direction of the width when an operator presses the handle downward to lift the front portion of the machine body for rotating the lawn mower.

The invention according to a fourth aspect is characterized in that a connecting portion at the rear end of the connecting rod of the catcher frame is connected to a first connecting bracket mounted to the widthwise center of a back surface of the machine body which faces the operator.

In general, the position of the center of gravity of the grass catcher containing the lawn chips stored therein is in front of the catcher roller, and hence a force for causing the machine body to lift theoretically acts on the connecting portion of the machine body with respect to the catcher frame. Then, the force to lift the machine body presses or lifts the front roller of the lawn mowing unit slightly depending on the position of the connecting portion with respect to the axial center of the driving drum of the machine body in terms of the fore-and-aft direction. However, when a force to lift the machine body is acting on the axial center of a driving wheel, the force to press or lift the front roller of the lawn mowing unit does not act thereon. In other words, the mowing height of the lawn is not affected by the weight of the lawn chips stored in the grass catcher. Therefore, the position of the connecting portion of the machine body with respect to the catcher frame exists ideally on the axial center of the driving drum. According to the fourth aspect of the invention, since the connecting portion at the rear end of the connecting rod for connecting the catcher supporting unit to the machine body is connected to the first connecting bracket mounted to the back surface of the machine body which faces the operator, the distance between the first connecting bracket and the axial center of the driving drum is significantly shorter than the distance between the catcher roller and the axial center of the driving drum. In other words, since the connecting position of the rear end of the catcher frame with respect to the machine body is near the axial center of the driving drum of the machine body, even when the force to lift the machine body acts by the weight of the lawn chips stored in the grass catcher, the mowing height of the lawn is rarely affected. Since the machine body is provided with the connecting bracket for connecting various devices or equipment at the widthwise center of the back surface of the machine body which faces the operator, it is also possible to mount the catcher frame to the existing lawn mower.

The invention according to a fifth aspect is characterized in that a first connecting pin to be arranged in the direction of the width of the machine body is inserted into the first connecting bracket, a second connecting pin to be arranged in the substantially fore-and-aft direction of the machine body is inserted into a second connecting bracket which is mounted to the rear end of the connecting rod of the catcher frame, and the machine body and the respective connecting brackets of the connecting rod are connected via a connector formed by combining two short tubular-shaped connecting pipes integrally and orthogonally to each other and the first and second connecting pins.

According to the fifth aspect of the invention, with the employment of the connector having a simple structure, the catcher frame is mounted to the first connecting bracket mounted to the back surface of the machine body which faces the operator so as to be rotatable in two different directions independently about the axial centers of the direction of travel of the machine body and of the direction of the width of the machine body.

The invention according to a sixth aspect is a catcher frame apparatus to be connected to a walk-type lawn mower having a lawn mowing unit mounted integrally thereto in front of a machine body and a grass catcher arranged in front of the lawn mowing unit for storing lawn chips mowed by the lawn mowing unit and being of a type to be operated by an operator walking behind the machine body including a catcher frame having a catcher supporting unit for detachably supporting the grass catcher and a connecting rod for connecting the catcher supporting unit to the machine body so as to be capable of rotating about an axis of rotation along the direction of the width of the machine body and a catcher roller mounted to the front lower end of the catcher supporting unit of the catcher frame along the direction of the width of the machine body, in which the catcher supporting unit of the catcher frame is arranged in front of the lawn mowing unit so that the substantially entire weight of the lawn chips stored in the grass catcher supported by the catcher supporting unit is applied to the catcher roller.

The invention according to the sixth aspect is similar to the invention according to the first aspect in terms of the catcher frame apparatus, and the effects and advantages are substantially the same as those in the invention according to the first aspect.

In this manner, according to the present invention, since the catcher frame having the catcher supporting unit for detachably supporting the grass catcher is connected to the machine body so as to be capable of rotating about the axial center of rotation along the direction of the width of the machine body, and the catcher roller extending along the direction of the width of the machine body is mounted to the front lower end of the catcher supporting unit of the catcher frame, the substantially entire weight of the grass catcher and the lawn chips stored in the grass catcher is applied to the catcher roller mounted to the front lower end of the catcher supporting unit and is rarely applied to the machine body by itself. Therefore, even when the weight of the lawn chips stored in the grass catcher increases in proportion to the amount of mowing operation, the load applied to the front roller which determines the mowing height of the lawn achieved by the lawn mowing unit is not or little increased, so that the mowing height of the lawn is constantly maintained from the beginning to the end of the mowing operation.

DESCRIPTION OF THE PREFERRED EMBODIMENTS

Figure 1:
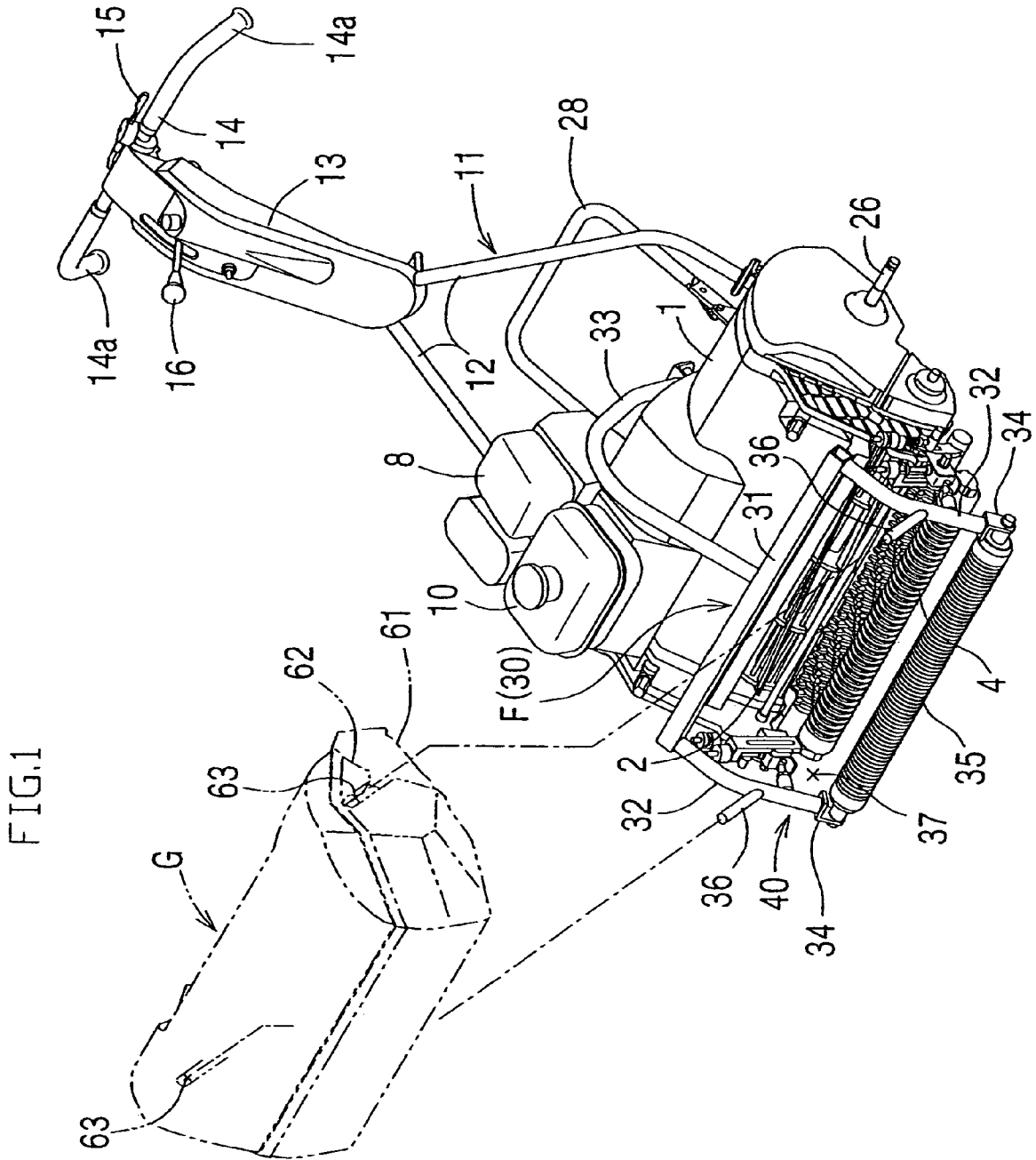
FIG. 1 is a perspective view of a walk-type lawn mower according to the present invention viewed obliquely from the front.
Figure 2:
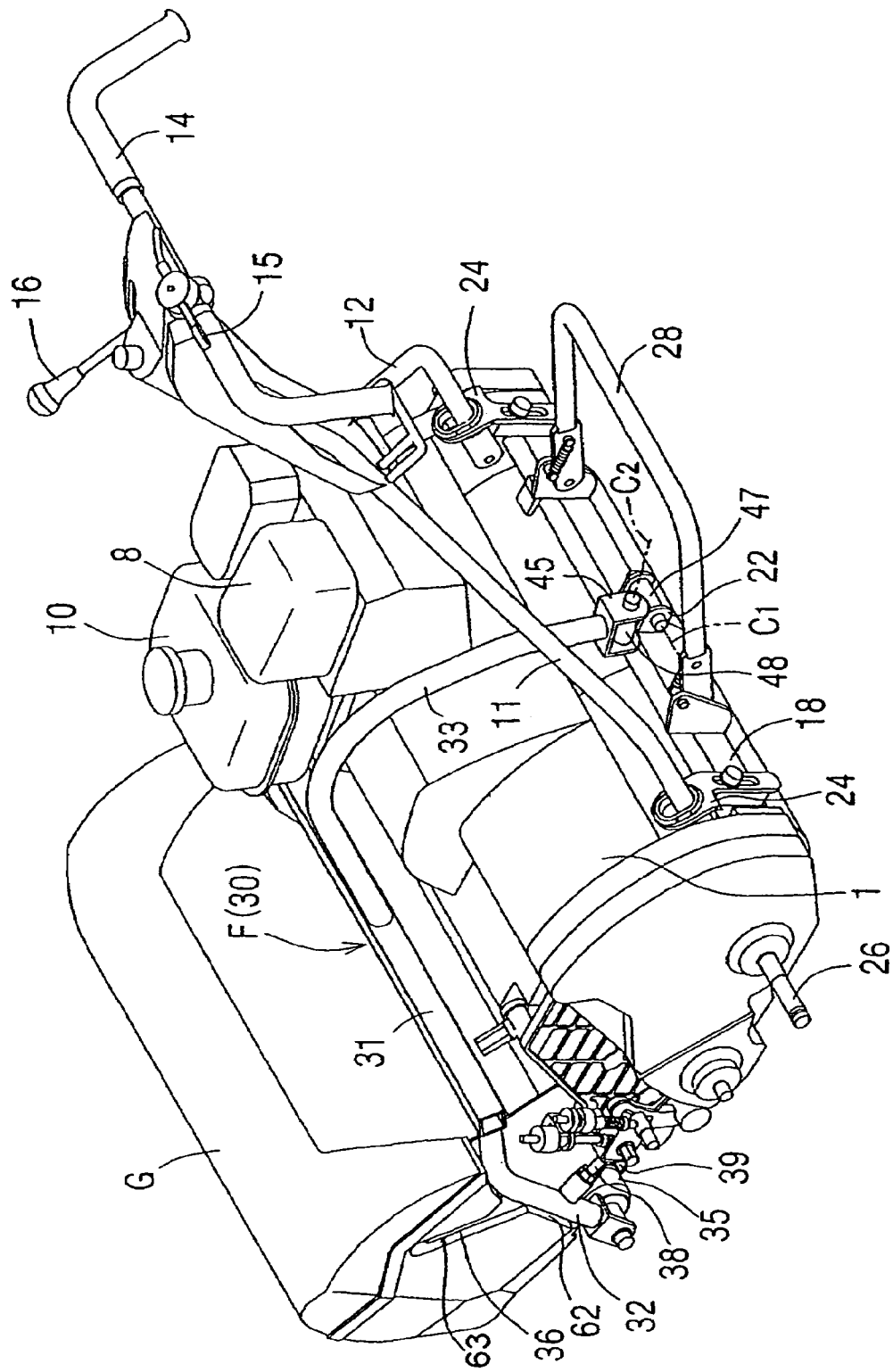
FIG. 2 is a perspective view of the same viewed obliquely from the rear.
Figure 3:
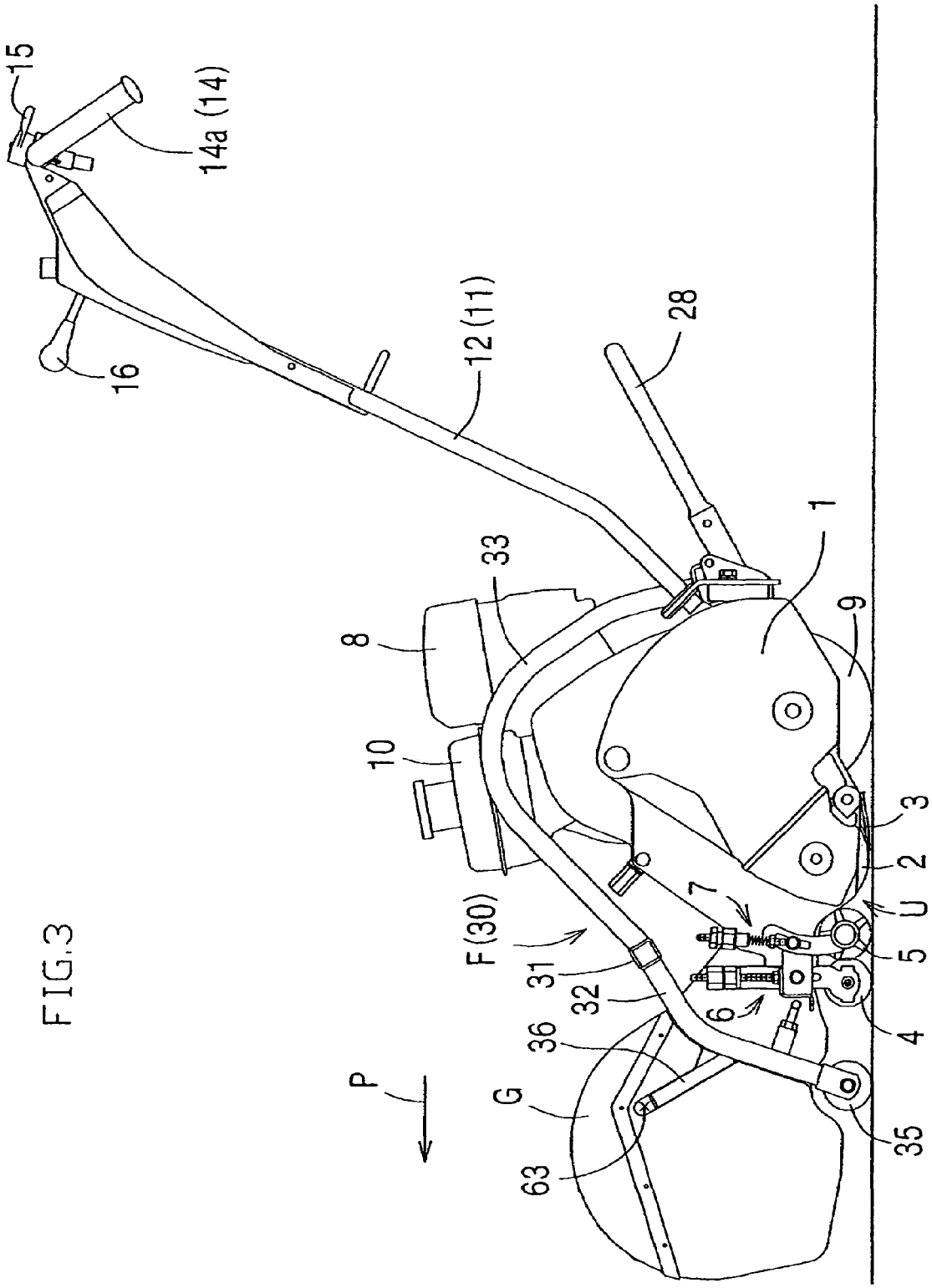
FIG. 3 is a side view of a walk-type lawn mower according to the present invention.
Figure 4:
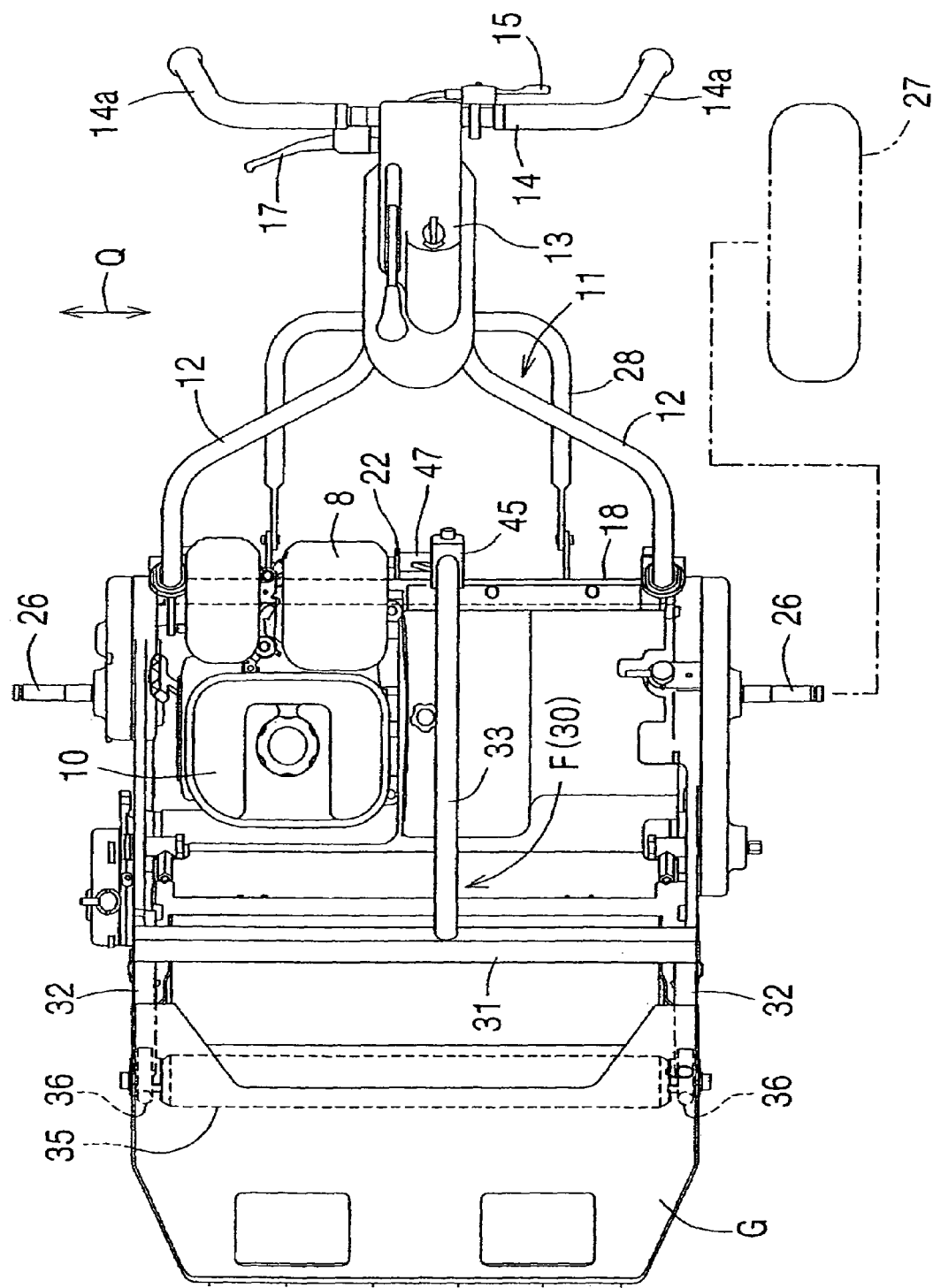
FIG. 4 is a plan view of a walk-type lawn mower according to the present invention.
Figure 5:
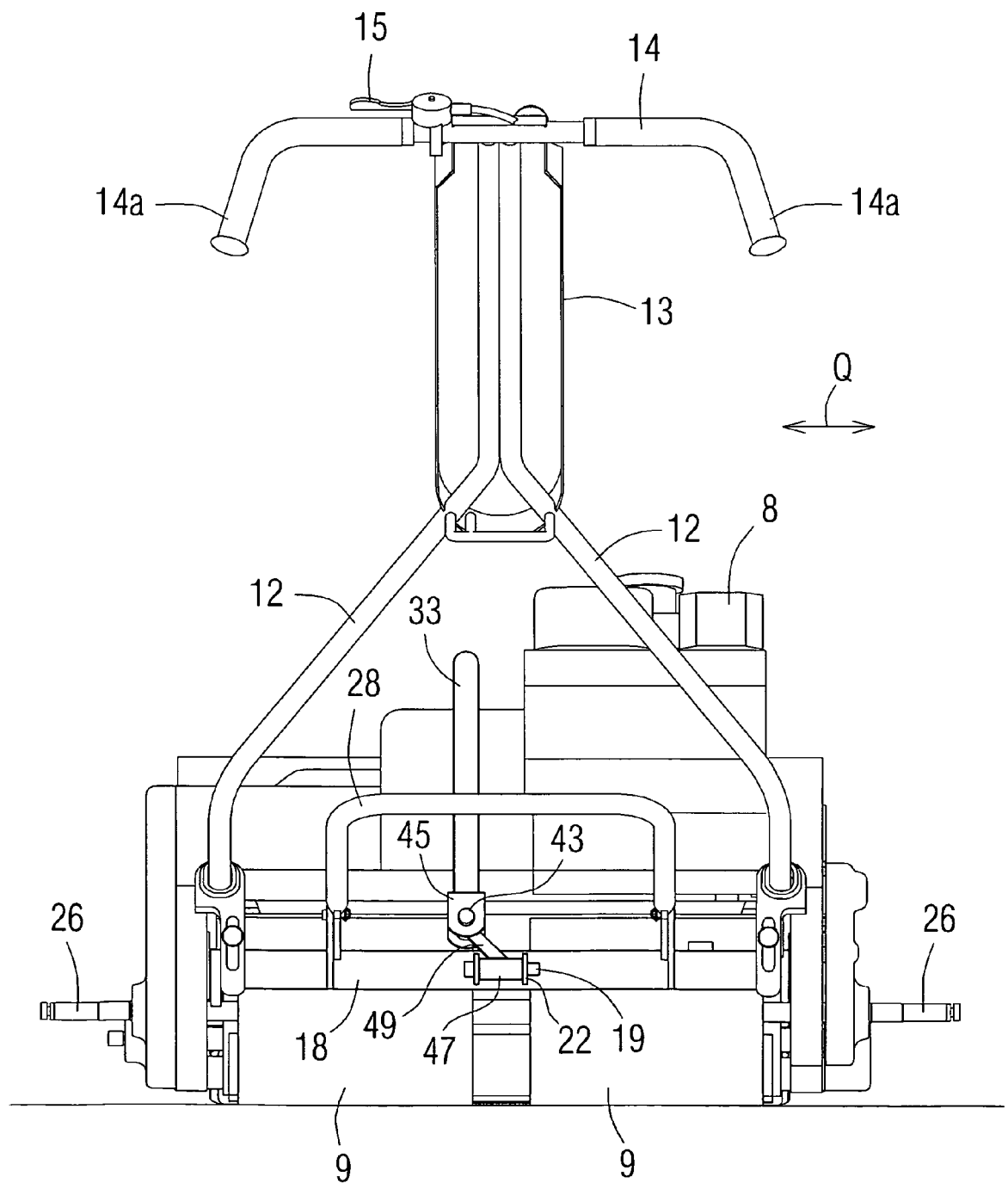
FIG. 5 is a back view of a walk-type lawn mower according to the present invention.

The present invention will be described further in detail on the basis of a preferred embodiment exemplified here. FIG. 1 and FIG. 2 are perspective views of a walk-type lawn mower (hereinafter, simply referred to as "lawn mower") according to the present invention when viewed obliquely front and rear, respectively, and FIGS. 3, 4 and 5 are a side view, a plan view and a back view of the same lawn mower respectively. The lawn mower includes a lawn mowing unit U integrally provided to the front portion of a machine body 1. The lawn mowing unit U includes a reel cutter 2 which is driven to rotate about the axial center extending in the direction of the width thereof, a fixed cutter 3 for mowing the lawn in cooperation with the reel cutter 2, a front roller 4 arranged in front of the reel cutter 2 for determining the mowing height of the lawn and a thatching roller 5 arranged between the reel cutter 2 and the front roller 4 for raking dried grass or the like biting in the lawn before being mowed. The reel cutter 2, the front roller 4 and the thatching roller 5 are arranged in the direction of the width of the machine body 1. The front roller 4 and the thatching roller 5 are adapted to be able to adjust the mounting position (mounting height) in the vertical direction with respect to the machine body 1 by height adjusting devices 6 and 7, respectively. The machine body 1 includes a driving drum 9 which is driven to rotate by a power of an engine 8, and the mowing height of the lawn is determined by the mounting position of the driving drum 9 and the front roller 4 which come into touch with the lawn surface with respect to the machine body 1. Since the mounting position of the driving drum 9 with respect to the machine body 1 is fixed, the mowing height of the lawn is changed by changing the mounting position (mounting height) of the front roller 4 with respect to the machine body 1. The power of the engine 8 is branched at a midpoint, and is transferred to the reel cutter 2 and the driving drum 9. In FIG. 1 to FIG. 4, reference numeral 10 designates a fuel tank arranged in front of the engine 8.

A handle arm 11 is integrally mounted to the rear portion of the machine body 1 so as to be oriented obliquely rearward and upward. The handle arm 11 is formed with two curved rods 12. The substantially halves of the rods 12 on the proximal side are mounted to the machine body 1 in such a manner that the distance therebetween gradually decreases from the machine body 1 and the substantially halves of the rods 12 are combined integrally. The substantially halves of the rods 12 on the distal side are in a state of being combined to each other. The combined portions of the rods 12 are covered with a handle cover 13. The obliquely upper end of the handle arm 11 (obliquely upper rear end with respect to the machine body 1) is integrally provided with a linear-shaped handle 14 having both grips 14a curved towards an operator at an obtuse angle at both ends thereof. In FIG. 1 to FIG. 5, reference numerals 15, 16 and 17 designate a throttle lever, a clutch lever and a brake lever.

Figure 6:
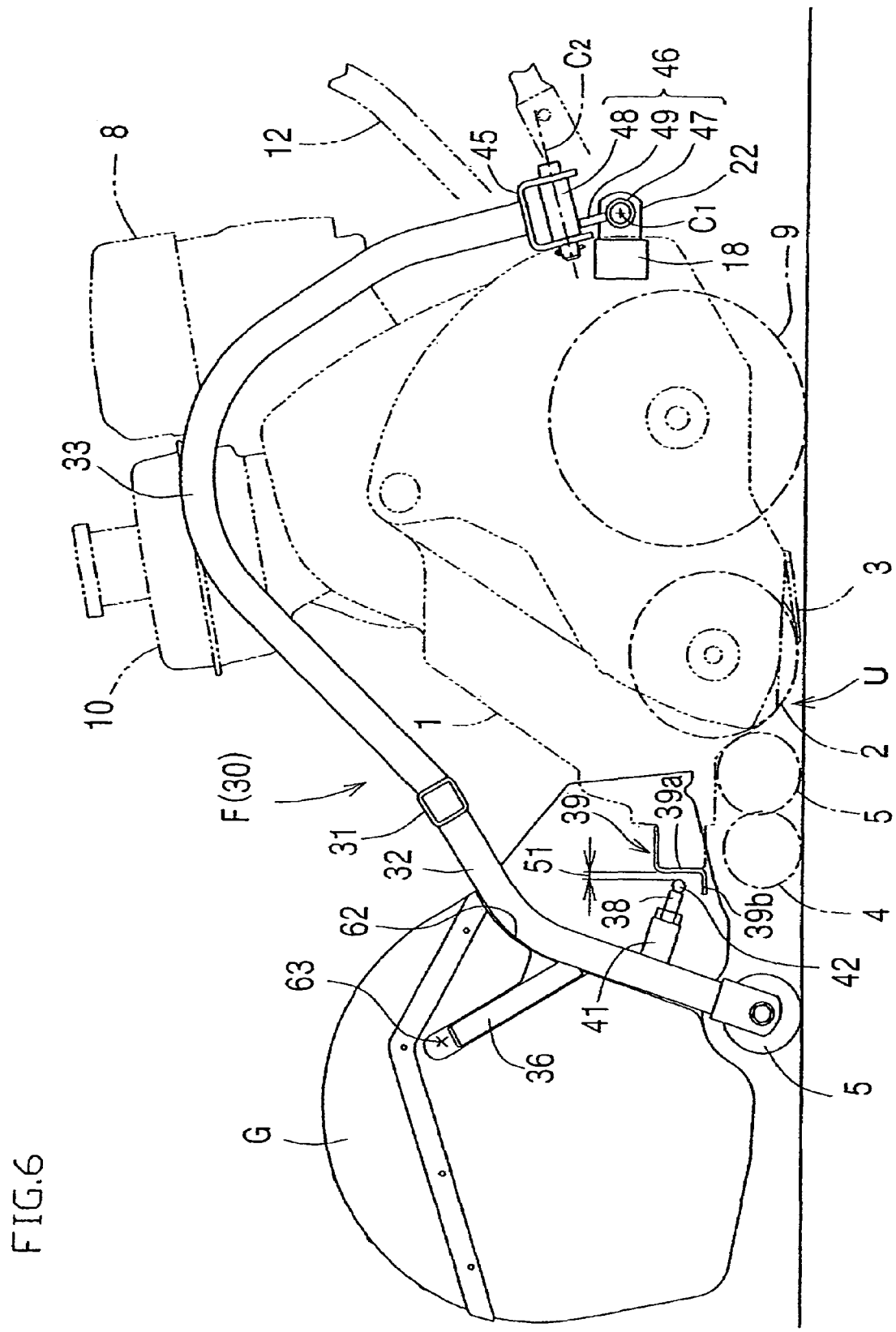
FIG. 6 is a side view mainly illustrating a connected state of a catcher frame apparatus F with respect to a machine body 1.
Figure 7:
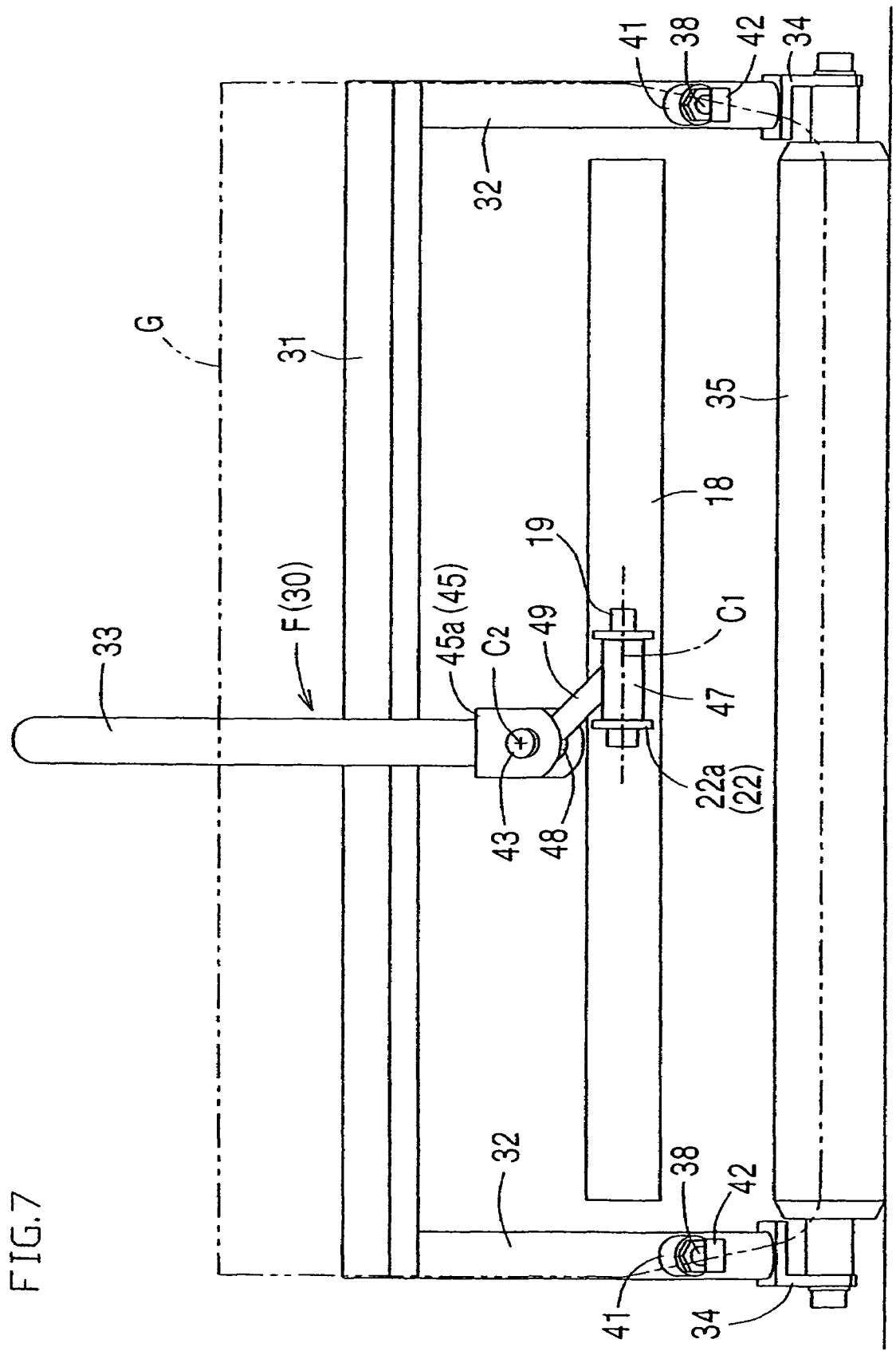
FIG. 7 is a back view of the catcher frame apparatus F.
Figure 8:
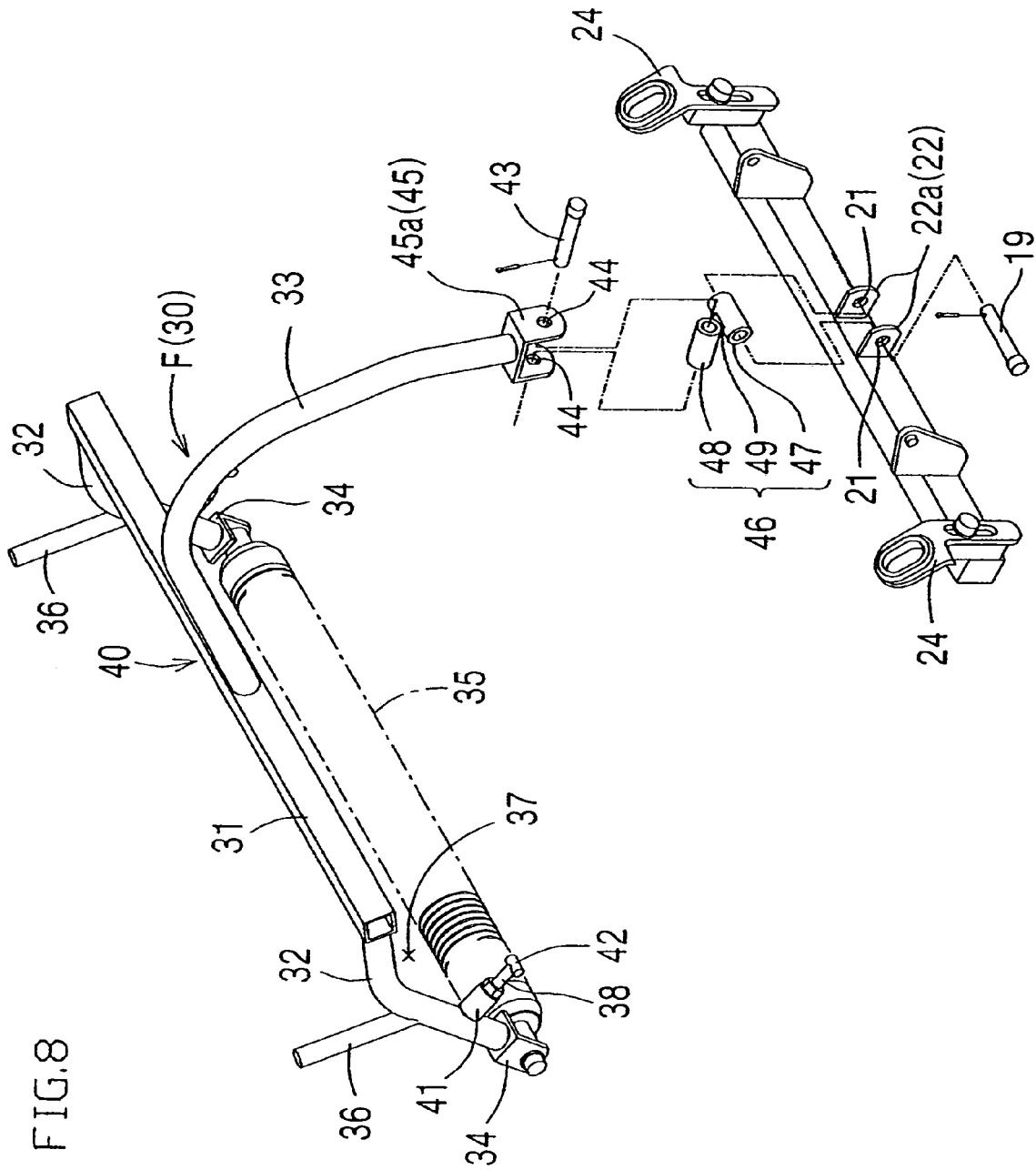
FIG. 8 is a perspective view showing a connected relation between a lateral plate member 18 and a catcher frame 30 of the machine body 1.
Figure 9:
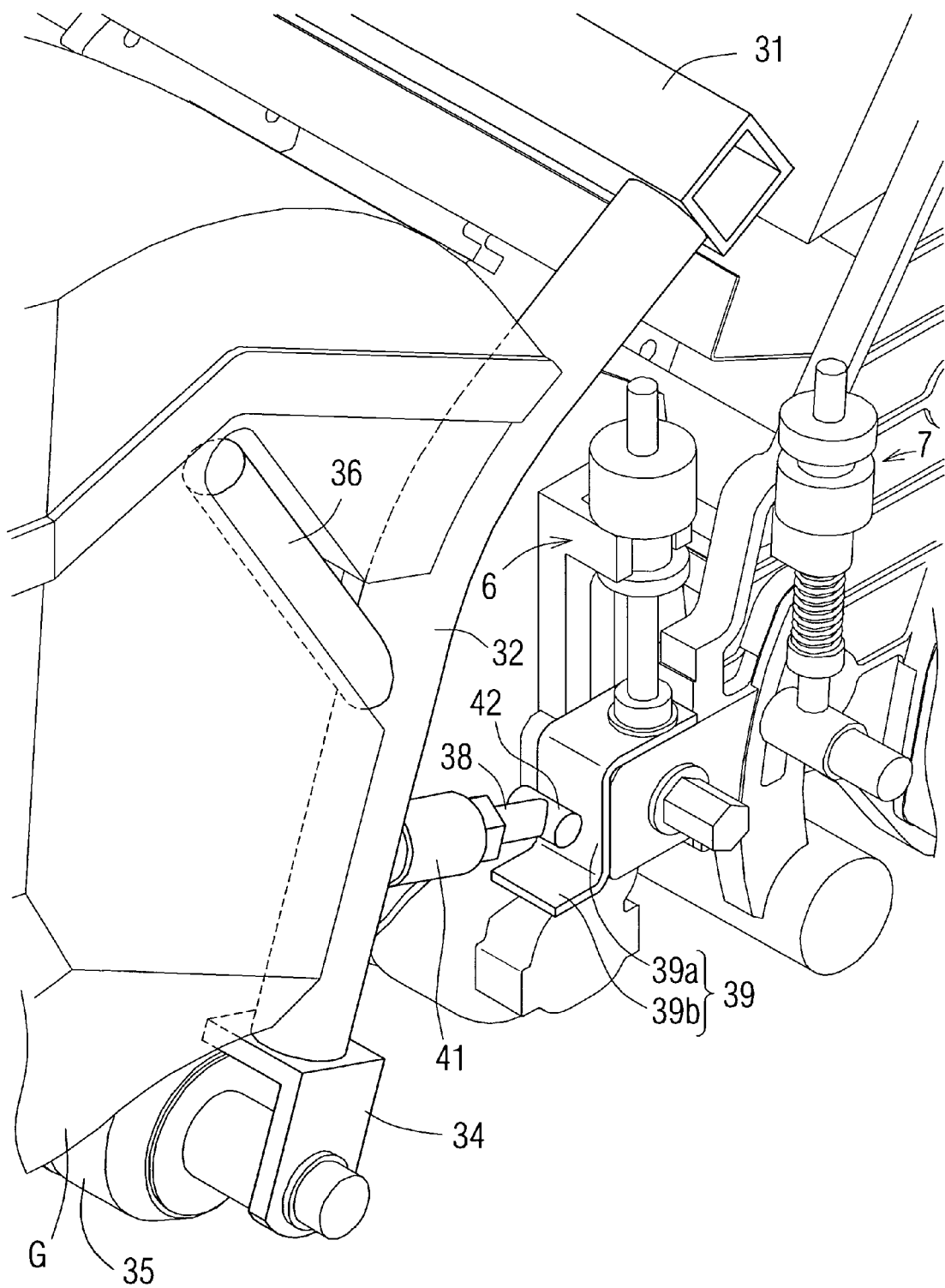
FIG. 9 is a perspective view of a portion which controls the rotation of the catcher frame 30 with respect to the machine body 1.
Figure 10:
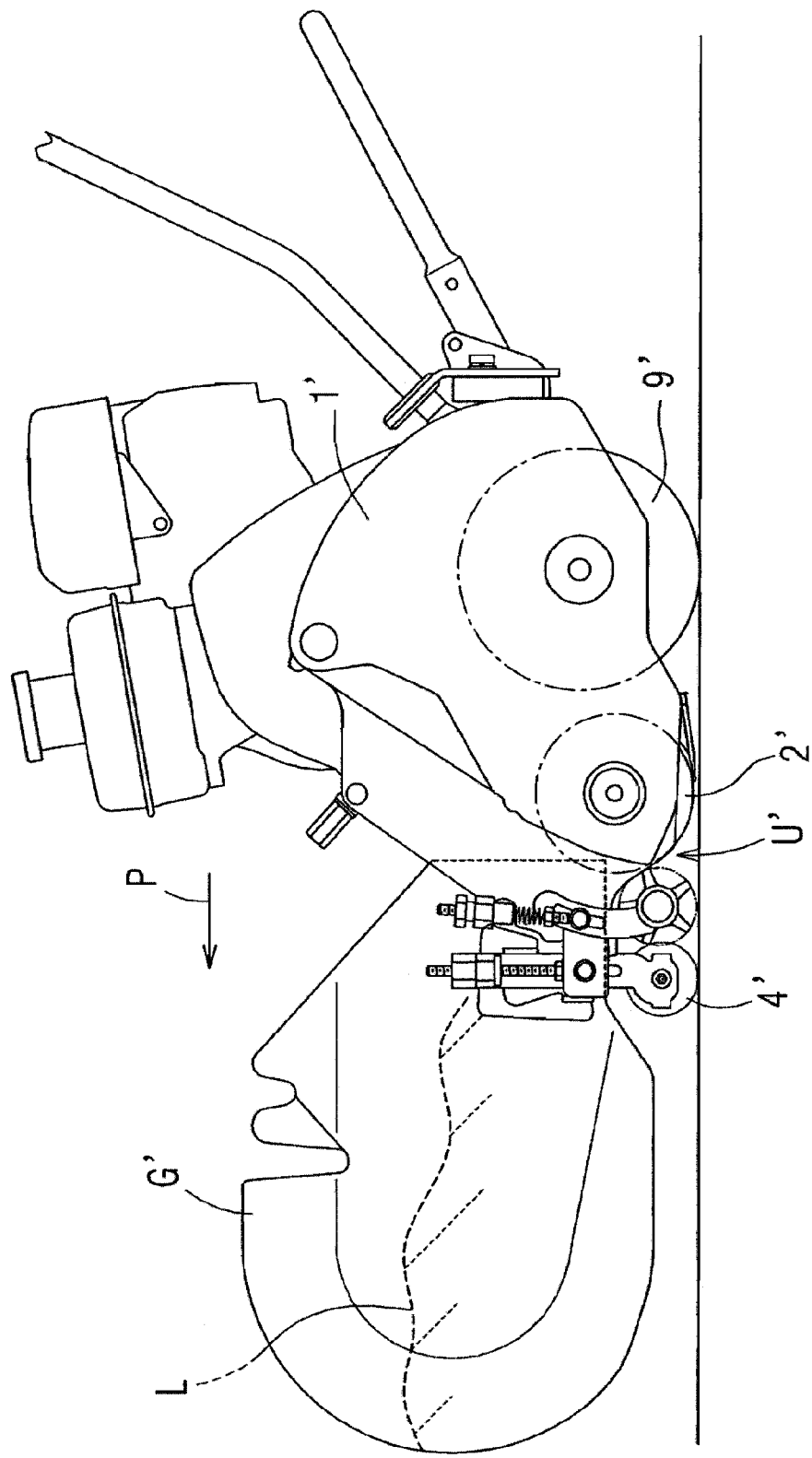
FIG. 10 is a side view of the walk-type lawn mower of "machine-body integrated type" in the related art.
Figure 11:
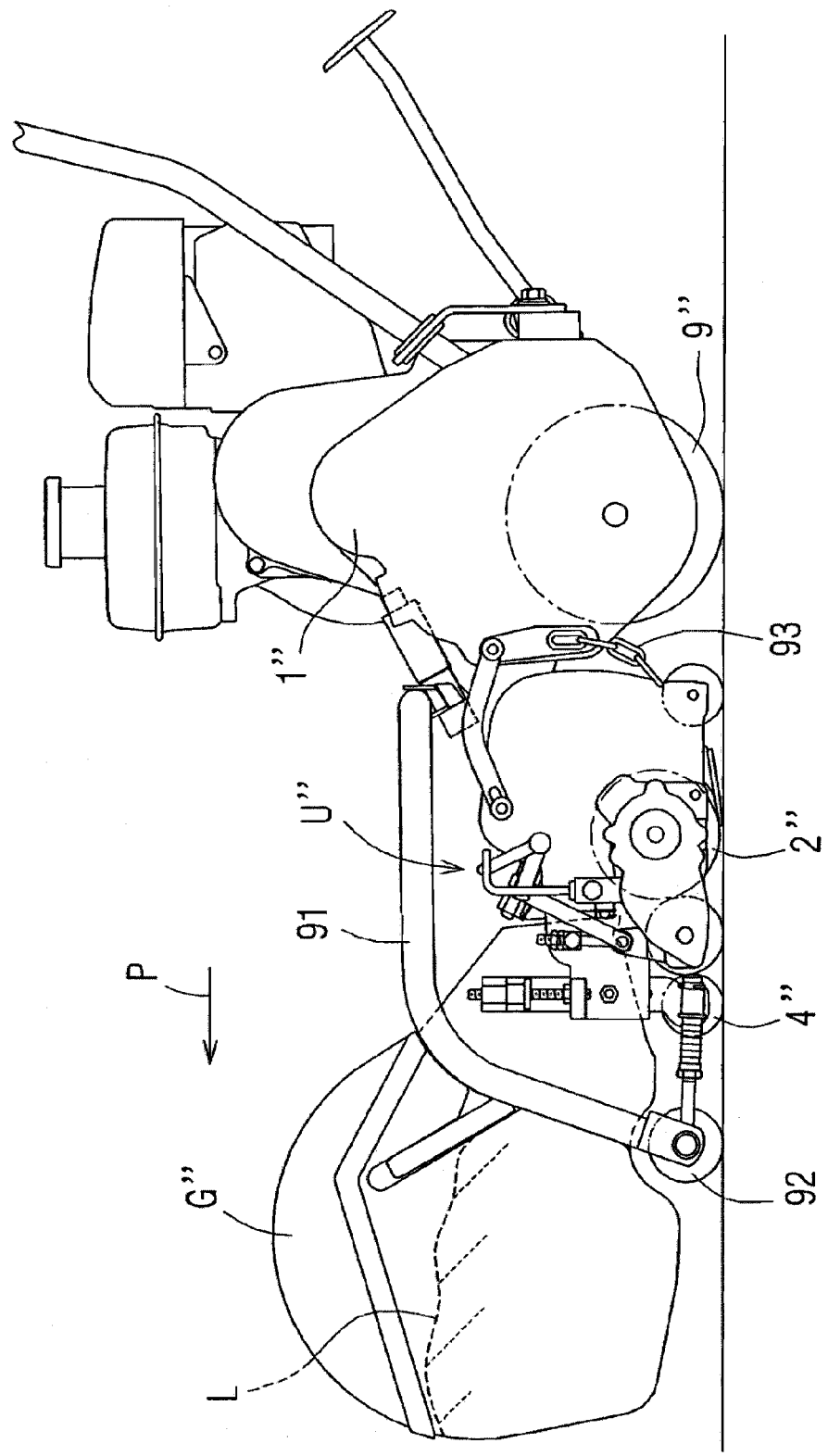
FIG. 11 is a side view of the walk-type lawn mower of "tow type" in the related art.

In the present invention, a catcher frame apparatus F specific for detachably mounting a grass catcher G is mounted to the machine body 1 so as to be capable of rotating about both a first center of rotation $C_1$ extending along the direction of the width of the machine body 1 and a second center of rotation $C_2$ extending in the direction orthogonal to the first center of rotation $C_1$, and the weight of lawn chips L stored in the grass catcher G is adapted to be supported by a catcher roller 35 mounted to the front lower end of a catcher supporting unit 40 of a catcher frame 30. Referring now to FIG. 6 to FIG. 9 in addition to FIG. 1 to FIG. 5, the catcher frame apparatus F will be described. FIG. 6 and FIG. 7 are a side view and a back view mainly illustrating a connected state of the catcher frame apparatus F with respect to the machine body 1, respectively. FIG. 8 is a perspective view showing a connecting relation between a lateral plate member 18 and the catcher frame 30 in the machine body 1, and FIG. 9 is a perspective view of a portion which controls the rotation of the catcher frame 30 with respect to the machine body 1.

As shown in FIG. 1, FIG. 2, FIG. 6 and FIG. 8, the catcher frame 30 includes a catcher supporting unit 40 having a straight lateral rod 31, supporting rods 32 connected orthogonally to the lateral rod 31 at both longitudinal ends and each being curved at a part in the longitudinal direction thereof and secured respectively by welding so as to be inclined obliquely downward toward the front in a mounted state and a connecting rod 33 secured to the lateral rod 31 at the longitudinal center thereof integrally by welding so as to be orthogonal to the lateral rod 31 and arranged so as to straddle over the machine body 1 and toward the rear of the machine body 1 in a mounted state. Supporting brackets 34 of an L-shape are secured to the front lower end of the pair of left and right supporting rods 32 which constitute the catcher supporting unit 40, and the both ends of the catcher roller 35 are rotatably supported by the pair of left and right supporting brackets 34. Straight catcher supporting bars 36 are integrally secured to the pair of left and right supporting rods 32 which constitute the catcher supporting unit 40 at the longitudinal center thereof obliquely forward and upward in a mounted state. A portion formed by the lateral rod 31, the pair of supporting rods 32 secured to the longitudinal both ends thereof and the pair of catcher supporting bars 36 constitutes a catcher supporting unit 40 for supporting the grass catcher G. As shown in FIG. 1 and FIG. 8, an opening defined by the lateral rod 31 and the pair of supporting rods 32 corresponds to an insertion opening 37 for inserting an insertion unit 61 of the grass catcher G (see FIG. 1 for both), and the pair of left and right supporting rods 32 have a function to support the grass catcher G in association with the pair of catcher supporting bars 36 with shoulders 62 formed on both side surfaces of the grass catcher G abutted thereto.

On the other hand, the both side surfaces of the grass catcher G are formed with the shoulders 62 having a shape corresponding to the general shape of the supporting rods 32 in side view for enabling insertion of the insertion unit 61 where an input port exists into the insertion opening 37 defined by the lateral rod 31 of the catcher supporting unit 40 of the catcher frame 30 and the pair of supporting rods 32 at both ends thereof and abutment support thereof on the respective supporting rods 32, and the both side surfaces of the grass catcher G are formed with straight insertion grooves 63 opening on the shoulders 62 on the opposite sides from the input port with respect to the shoulders 62. By inserting or removing the catcher supporting bars 36 of the catcher supporting unit 40 into or from the insertion grooves 63 of the grass catcher G, the grass catcher G with respect to each other, the grass catcher G is detachable with respect to the catcher supporting unit 40 of the catcher frame 30. Since the pair of catcher supporting bars 36 are directed obliquely upward and forward in a state in which the catcher frame 30 is connected to the machine body 1, the catcher supporting bars 36 are inserted into the respective insertion grooves 63 on both side surfaces, and the grass catcher G supported by the catcher supporting unit 40 is stably supported by the own weight of the grass catcher G and the weight of the lawn chips L which is increased in stored amount gradually in association with the progress of the mowing operation without coming apart from the catcher supporting unit 40.

As shown in FIG. 3 and FIG. 6 to FIG. 9, stopper bolts 38 are integrally mounted to the back side of the pair of left and right supporting rods 32 obliquely rearward and downward respectively. The respective stopper bolts 38 are members on the catcher frame 30 side which come into abutment with horizontal panels 39b of L-shaped stopper panels 39 provided on the front side of the height adjusting device 6 of the front roller 4, and hence controls the catcher roller 35 so as not to be lowered to a level exceeding a preset position with respect to the machine body 1 by the rotation of the catcher frame 30 about the first center of rotation $C_1$ and controls the catcher roller 35 so as not to incline beyond a preset angle with respect to the direction of the width of the machine body 1 by the rotation of the catcher frame 30 about the second center of rotation $C_2$. The stopper bolts 38 are screwed into base members 41 secured to the supporting rods 32 so as to be adjustable in projecting length, and the stopper bolts 38 each include a contact rod 42 integrally secured thereto at the distal end thereof for ensuring abutment of the stopper panel 39 with the horizontal panel 39b by the rotation of the catcher frame 30 about the second center of rotation $C_2$ so as to extend in a direction along the horizontal direction which is orthogonal to the axial center of the stopper bolts 38. By adjusting the projecting length of the stopper bolts 38 with respect to the base member 41, adjustment of the lowest position of the catcher roller 35 with respect to the machine body 1 when rotating the lawn mower by lowering the handle 14 or during the mowing operation on the lawn surface inclining downward in the direction of travel of the lawn mower is achieved.

In order to control the catcher roller 35 so as not to be lowered beyond the preset position with respect to the machine body 1 by the rotation of the catcher frame 30 about the first center of rotation $C_1$ and to control the catcher roller 35 so as not to be inclined beyond the preset angle with respect to the direction of the width of the machine body 1 by the rotation of the catcher frame 30 about the second center of rotation $C_2$, it is also possible to connect the catcher roller 35 and the both ends of the front roller 4 loosely via the links, respectively. In a case of mowing remained lawn in a periphery of the green along the periphery, the machine body 1 is travelled toward the inside of the green. Therefore, the grass catcher G in which the lawn chips L are stored is apt to move outwardly of the green in a state of being twisted along the direction of the width of the machine body 1. However, the outside contact rod 42 from between the pair of left and right contact rods 42 comes into abutment with a vertical panel 39a of the stopper panels 39, so that the twisting exceeding the limit is prevented.

On the other hand, the lateral plate member 18 is provided on the back surface of the machine body 1, and the lateral plate member 18 is provided with a first connecting bracket 22 including a pair of bracket strips 22a each formed with an insertion hole 21 for allowing insertion of a first connecting pin 19 at the longitudinal center of the lateral plate member 18 so as to project rearward. The first connecting bracket 22 is used for connecting and towing various devices relating to the mowing operation (for example, a tow cart on which the operator rides for avoiding necessity of walking when causing the lawn mower to travel without carrying out the mowing operation), and is provided on most of the lawn mowers in advance. The catcher frame apparatus F in the present invention is connected to the machine body 1 using the first connecting bracket 22 provided thereon in advance. Rod supporting members 24 for allowing insertion of the proximal ends of the respective rods 12 of the handle arm 11 for supporting same and enabling adjustment of the height of the handle 14 are mounted at the longitudinal both ends of the lateral plate member 18. The lateral plate member 18 is provided with a leg frame 28 provided for increasing the height of the machine body 1 when mounting driving wheels 27 (see FIG. 4) to a driving shaft 26 projecting from both sides of the machine body 1, which are arranged so as to be directed obliquely rearward and upward when not in use.

As shown in FIG. 2, FIG. 7 and FIG. 8, a second connecting bracket 45 including a pair of bracket strips 45a each having a pin hole 44 for allowing insertion of a second connecting pin 43 is integrally secured to a free end of the connecting rod 33 of the catcher frame 30. The respective pin holes 44 of the second connecting bracket 45 are formed in the direction orthogonal to both the direction of the width of the machine body 1 which corresponds to the direction of formation of the respective insertion holes 21 of the first connecting bracket 22 and the longitudinal direction of a straight portion of the connecting rod 33 including the free end. The first and second connecting brackets 22 and 45 are connected via a connector 46 and the first and second connecting pins 19 and 43. The connector 46 has a configuration in which first and second connecting pipes 47 and 48 having a tubular shape and a length insertable between the bracket strips 22a and 45a of the first and second connecting brackets 22 and 45 respectively are integrally connected via a connecting panel 49 with the axial centers thereof directed orthogonal to each other. The reason why the second connecting pipe 48 is arranged at a position shifted from the longitudinal center of the first connecting pipe 47 is simply for avoiding interference when the connecting rod 33 is arranged to a portion straddling the machine body 1, and there is no essential reason. Therefore, when designing newly without using the first connecting bracket 22 of the existing lawn mower, it is not necessary to shift the second connecting pipe 48 as described above.

Therefore, when the first and second connecting pipes 47 and 48 of the connector 46 are inserted respectively between the first connecting bracket 22 of the machine body 1 and the second connecting bracket 45 of the catcher frame 30 and connected by the first and second connecting pins 19 and 43, respectively, the catcher frame apparatus F is connected to the machine body 1 so as to be capable of rotating about the first center of rotation $C_1$ in the direction in which the height of the catcher roller 35 with respect to the machine body 1 changes, and rotating about the second center of rotation $C_2$ in the direction in which the catcher roller 35 is inclined with respect to the direction of the width of the machine body 1.

In the state in which the lawn mower travels on the horizontal lawn surface, a slight gap 51 (see FIG. 6) is formed between the contact rods 42 at the distal end of the stopper bolts 38 and the vertical panel 39a of the stopper panels 39. Therefore, when the lawn surface is inclined downward along the direction of travel P of the lawn mower, the catcher roller 35 comes in touch with the lawn surface until it reaches an inclination corresponding to the downward inclination of the gap 51. In contrast, when the handle 14 is moved downward about the driving drum 9 as a fulcrum, the machine body 1 rotates in the direction in which the front roller 4 is moved away from the lawn surface, and the gap 51 is solved by the rotation of the machine body 1, so that the contact rods 42 at the distal ends of the stopper bolts 38 come into abutment with the horizontal panels 39b of the stopper panels 39 and then the grass catcher G supported by the catcher frame apparatus F and the catcher frame 30 is rotated integrally with the machine body 1 in the same direction.

Then, when the reel cutter 2 and the driving drum 9 are driven to rotate by the power of the engine 8, the lawn mower, which is operated by the operator walking behind, proceeds the direction of the arrow P and the lawn is mowed at a length corresponding to the mounting position (height) of the front roller 4 with respect to the machine body 1 by the cooperation of the reel cutter 2 and the fixed cutter 3. The mowed lawn chips L are thrown from the input port of the grass catcher G and stored into the interior thereof by the high-speed rotation of the reel cutter 2. Therefore, the lawn chips L of an amount substantially in proportion to the amount of the mowing operation with the lawn mower are stored into the grass catcher G, and the entire weight of the lawn chips L is gradually increased. However, since the specific catcher frame apparatus F for detachably mounting the grass catcher G is connected to the machine body 1 so as to be capable of rotating about both the first center of rotation $C_1$ extending along the direction of the width of the machine body 1 and the second center of rotation $C_2$ extending orthogonally to the first center of rotation $C_1$, substantially the entire weight of the lawn chips L stored in the grass catcher G is supported by the catcher roller 35 mounted to the lower end of the catcher supporting unit 40 of the catcher frame 30 and is not applied to the front roller 4, so that the mowing height of the lawn is maintained at a constant height even when the weight of the lawn chips L stored in the grass catcher G increases from the beginning to the end of the mowing operation.

In a case in which the lawn surface being mowed is inclined in either one of the direction of travel P of the lawn mower and the direction of the width Q of the machine body 1 extending orthogonally thereto, or in the direction combining the both directions P and Q, the catcher frame apparatus F rotates independently about the first center of rotation $C_1$ as an axial center of the first connecting pin 19 and the second center of rotation $C_2$ as an axial center of the second connecting pin 43.

Therefore, the catcher roller 35 follows the inclination (undulation) of the lawn surface in all directions and travels stably in a state in which the substantially entire length is constantly in touch with the lawn surface. It means that the catcher roller 35 mounted to the front lower end of the catcher frame 30 stably supports the entire weight of the lawn chips L stored in the grass catcher G even when the lawn surface is inclined, so that the lawn surface is prevented from becoming damaged. When the catcher roller 35 does not follow the inclination of the lawn surface in all directions, there may be a case in which only part of the catcher roller 35 in the axial direction comes in touch with the lawn surface, and the remaining portion is lifted from the lawn surface. In this case, the probability that the lawn is damaged at a portion where the catcher roller 35 is partly in touch is high.

Here, since the center of gravity of the grass catcher G in which the lawn chips L are stored exists in front of the catcher roller 35, when the weight of the lawn chips L stored in the grass catcher G is applied to the catcher roller 35, a force to lift the machine body 1 acts on a connecting portion on the back surface of the machine body 1 which connects the catcher frame 30 to the machine body 1. Since the connecting portion is arranged on the opposite side from the catcher roller 35 with respect to the axial center of the driving drum 9, a force to lift the front roller 4 of the lawn mowing unit U acts thereon. When the connecting portion of the machine body 1 for connecting the catcher frame 30 exists on the axial center of the driving drum 9, the weight of the lawn chips L stored in the grass catcher G does not act on the front roller 4 at all. In the embodiment shown above, the connecting portion for connecting the catcher frame 30 to the machine body 1 is connected to the first connecting bracket 22 mounted to the back surface of the machine body 1 which faces the operator, the distance between the first connecting bracket 22 and the axial center of the driving drum 9 is significantly shorter than the distance between the catcher roller 35 of the catcher frame apparatus F and the axial center of the driving drum 9. Therefore, there is an advantage such that the weight of the lawn chips L stored in the grass catcher G acts little on the front roller 4. In addition, since the first connecting bracket 22 for connecting the various devices is provided at the widthwise center of the back surface of the machine body 1 which faces the operator, the catcher frame apparatus F has an advantage over being mountable also to the existing lawn mower.

Therefore, when the lawn mower is newly designed, arrangement of the connecting portion of the catcher frame 30 with respect to the machine body 1 right on the axial center of the driving drum 9 or the position in the vicinity thereof is an important point in terms of design from the viewpoint that the weight of the lawn chips L stored in the grass catcher G is not applied to the front roller 4. Therefore, the connecting position of the catcher frame 30 with respect to the machine body 1 is not limited to the back surface of the machine body as in the embodiment shown above, and may be selected freely.

The catcher roller 35 mounted to the lower end of the catcher supporting unit 40 of the catcher frame 30 travels at the forefront of the machine body 1 during the mowing operation. Therefore, there is an advantage such that it functions as a dewlap roller when mowing the lawn moist with dew, and hence the mowing operation for the lawn moist with dew is smoothly carried out. The catcher roller 35 in the embodiment is formed with a number of circumferential grooves on the outer peripheral surface thereof so as to reduce trampling on the lawn. However, it is also possible to employ a smooth roller which has no circumferential groove in order to enhance the dewlap function of the catcher roller 35. Also, by inserting or removing the catcher supporting bars 36 of the catcher supporting unit 40 into or from the insertion grooves 63 of the grass catcher G with respect to each other, the grass catcher G is detachable with respect to the catcher supporting unit 40 of the catcher frame 30.

In the embodiment shown above, by inserting or removing the catcher supporting bars 36 of the catcher supporting unit 40 into or from the insertion grooves 63 of the grass catcher G with respect to each other, the grass catcher G is detachable with respect to the catcher supporting unit 40 of the catcher frame 30. However, since the catcher supporting unit 40 of the catcher frame 30 in the present invention must simply be able to detachably support the grass catcher G, a configuration in which inserted member of short square-tubular shaped which allows insertion and removal of the inserting portion 61 of the grass catcher G is mounted between the pair of supporting rods 32 which constitute the catcher supporting unit 40 in the posture inclined rearward instead of the catcher supporting bars 36 is also applicable. A configuration in which the grass catcher G is hooked on the lateral rod 31 of the catcher supporting unit 40 to bring the grass catcher G into abutment with and supported by the pair of left and right supporting rods 32 by the weight of the grass catcher G.

The invention claimed is:

1. A walk-type lawn mower comprising a machine body, a lawn mowing unit mounted in front of the machine body, a grass catcher arranged in front of the lawn mowing unit for storing lawn clippings mowed by the lawn mowing unit, and a catcher frame apparatus, the catcher frame apparatus including:
   a catcher frame having a catcher supporting unit for detachably supporting the grass catcher and a connecting rod for connecting the catcher supporting unit to the machine body, the connecting rod being rotatable about a first axis parallel to a width direction of the machine body; and
   a catcher roller mounted to a front lower end of the catcher supporting unit of the catcher frame, the catcher roller extending in the direction of the width of the machine body,
   wherein the catcher supporting unit of the catcher frame is arranged in front of the lawn mowing unit such that substantially an entire weight of the lawn clippings stored in the grass catcher supported by the catcher supporting unit is applied to the catcher roller.

2. The walk-type lawn mower according to claim 1, wherein the catcher supporting unit of the catcher frame is mounted to the machine body via the connecting rod such that the catcher supporting unit is rotatable about a second axis parallel to a longitudinal direction of the machine body for allowing followability on a surface inclined in the width direction of the machine body.

3. The walk-type lawn mower according to claim 2, wherein the machine body includes a controlling member for controlling the catcher supporting unit of the catcher frame such that lowering the catcher supporting unit below a predetermined limit is prevented and inclining the catcher supporting unit beyond a predetermined angle is prevented.

4. The walk-type lawn mower according to claim 2, further comprising:
   a first connecting bracket mounted to a back surface of the machine body at a widthwise center of the back surface, the back surface facing an operator;
   wherein a connecting portion at a rear end of the connecting rod of the catcher frame is connected to the first connecting bracket.

5. The walk-type mower according to claim 2, wherein the catcher supporting unit is disposed on a front side of the walk-type mower, the front side being opposite a back side of the walk-type mower, and
   wherein the width direction of the machine body is perpendicular to a direction extending from the front side to the back side of the walk-type mower and the longitudinal direction of the machine body is parallel to the direction extending from the front side of the walk-type mower to the back side of the walk-type mower.

6. The walk-type lawn mower according to claim 1, wherein the machine body includes a controlling member for controlling the catcher supporting unit of the catcher frame such that lowering the catcher supporting unit below a predetermined limit is prevented and inclining the catcher supporting unit beyond a predetermined angle is prevented.

7. The walk-type lawn mower according to claim 6, further comprising:
   a first connecting bracket mounted to a back surface of the machine body at a widthwise center of the back surface, the back surface facing an operator;
   wherein a connecting portion at a rear end of the connecting rod of the catcher frame is connected to the first connecting bracket.

8. The walk-type mower according to claim 1, wherein the catcher supporting unit is disposed on a front side of the walk-type mower, the front side being opposite a back side of the walk-type mower, and
   wherein the width direction of the machine body is perpendicular to a direction extending from the front side to the back side of the walk-type mower.

9. A walk-type lawn mower comprising a machine body, a lawn mowing unit mounted in front of the machine body, a grass catcher arranged in front of the lawn mowing unit for storing lawn clippings mowed by the lawn mowing unit, and a catcher frame apparatus including, the catcher frame apparatus including:
   a catcher frame having a catcher supporting unit for detachably supporting the grass catcher and a connecting rod for connecting the catcher supporting unit to the machine body, the connecting rod being rotatable about a first axis parallel to a width direction of the machine body, and
   a catcher roller mounted to a front lower end of the catcher supporting unit of the catcher frame, the catcher roller extending in the direction of the width of the machine body; and
   a first connecting bracket mounted to a back surface of the machine body at a widthwise center of the back surface, the back surface facing an operator,
   wherein the catcher supporting unit of the catcher frame is arranged in front of the lawn mowing unit such that substantially an entire weight of the lawn clippings stored in the grass catcher supported by the catcher supporting unit is applied to the catcher roller;
   wherein a connecting portion at a rear end of the connecting rod of the catcher frame is connected to the first connecting bracket.

10. The walk-type lawn mower according to claim 9, further comprising
    a first connecting pin extending in the direction of the width of the machine body inserted into the first connecting bracket,
    a second connecting bracket mounted to the rear end of the connecting rod of the catcher frame;

a second connecting pin extending in a longitudinal direction of the machine body inserted into the second connecting bracket; and a connector comprising a first short tubular-shaped connecting pipe and a second short tubular-shaped connecting pipe formed integrally with the first short tubular-shaped connecting pipe, the first short tubular-shaped connecting pipe being orthogonal to the second short tubular-shaped connecting pipe;

wherein the first connecting bracket and the second connecting bracket are connected via the connector.

11. The walk-type lawn mower according to claim 10, wherein the first connecting pin extends through the first connecting bracket and first short tubular-shaped connecting pipe, and the second connecting pin extends through the second connecting bracket and the second short tubular-shaped connecting pipe such that the catcher frame apparatus is rotatable about the first axis parallel to a width direction of the machine body and is rotatable about a second axis parallel to a longitudinal direction of the machine body.

12. A catcher frame apparatus to be connected to a walk-type lawn mower having a lawn mowing unit mounted in front of a machine body and a grass catcher arranged in front of the lawn mowing unit for storing lawn clippings mowed by the lawn mowing unit, the catcher frame apparatus comprising:

a catcher frame having a catcher supporting unit for detachably supporting the grass catcher and a connecting rod for connecting the catcher supporting unit to the machine body, the connecting rod being rotatable about an axis parallel to a width direction of the machine body; and a catcher roller mounted to the front lower end of the catcher supporting unit of the catcher frame, the catcher roller extending in the direction of the width of the machine body, wherein the catcher supporting unit of the catcher frame is arranged in front of the lawn mowing unit such that substantially an entire weight of the lawn clippings stored in the grass catcher supported by the catcher supporting unit is applied to the catcher roller.

13. A walk-type lawn mower comprising a machine body, a lawn mowing unit mounted in front of the machine body, a grass catcher arranged in front of the lawn mowing unit for storing lawn clippings mowed by the lawn mowing unit, and a catcher frame apparatus, the catcher frame apparatus including:

a catcher frame having a catcher supporting unit for supporting the grass catcher and a connecting rod for connecting the catcher supporting unit to the machine body, the connecting rod being rotatable about a first axis parallel to a width direction of the machine body, and a catcher roller mounted to a front lower end of the catcher supporting unit of the catcher frame, the catcher roller extending in the direction of the width of the machine body;

a first connecting bracket mounted to a back surface of the machine body, the back surface being opposite a front of the machine body where the grass catcher is arranged; and a connecting portion connecting the connecting rod to the first connecting bracket, the connecting portion being provided at a rear end of the connecting rod, wherein the catcher supporting unit of the catcher frame is arranged in front of the lawn mowing unit such that substantially an entire weight of the lawn clippings stored in the grass catcher supported by the catcher supporting unit is applied to the catcher roller.

* * * * *